US008995034B2

(12) United States Patent
Park et al.

(10) Patent No.: US 8,995,034 B2
(45) Date of Patent: Mar. 31, 2015

(54) IMAGE FORMING APPARATUS AND METHOD OF COLOR REVISING

(75) Inventors: In-ho Park, Suwon-si (KR);
Kyeong-man Kim, Yongin-si (KR);
Hyun-soo Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 118 days.

(21) Appl. No.: 13/524,233

(22) Filed: Jun. 15, 2012

(65) Prior Publication Data
US 2012/0320394 A1 Dec. 20, 2012

(30) Foreign Application Priority Data

Jun. 20, 2011 (KR) .................. 10-2011-0059772
Oct. 4, 2011 (KR) .................. 10-2011-0100696

(51) Int. Cl.
*G03F 3/08* (2006.01)
*G06K 1/00* (2006.01)
*H04N 1/60* (2006.01)

(52) U.S. Cl.
CPC .................. *H04N 1/6033* (2013.01)
USPC .................. 358/518; 358/2.1; 358/1.9

(58) Field of Classification Search
USPC .................. 358/1.9, 2.1, 518
See application file for complete search history.

(56) References Cited

U.S. PATENT DOCUMENTS

| 5,452,112 A * | 9/1995 | Wan et al. ............. 358/504 |
| 8,102,564 B2 * | 1/2012 | Klassen ............. 358/1.9 |
| 2004/0130739 A1 * | 7/2004 | Adam et al. ............. 358/1.9 |
| 2004/0239935 A1 * | 12/2004 | Kitazawa ............. 356/406 |
| 2005/0071104 A1 * | 3/2005 | Viturro et al. ............. 702/85 |
| 2005/0190390 A1 * | 9/2005 | Yamada et al. ............. 358/1.9 |
| 2007/0223016 A1 * | 9/2007 | Ichitani ............. 358/1.9 |
| 2010/0177365 A1 * | 7/2010 | Chung et al. ............. 358/504 |

FOREIGN PATENT DOCUMENTS

JP  2006-148834  6/2006

OTHER PUBLICATIONS

Christian Goltz, Colour Calibration, Sep. 27, 2009, www.kis-of-light.net.*

* cited by examiner

*Primary Examiner* — Barbara Reinier
(74) *Attorney, Agent, or Firm* — Staas & Halsey LLP

(57) ABSTRACT

An image forming apparatus includes a storage unit to store a color conversion table, a user interface unit to receive a color revision initiation command, an image forming unit to print a color chart generated based on the color conversion table if the color revision initiation command is received, the color chart having a plurality of CMYK mixed colors having at least one of brightness and chroma changed, a scan unit to scan the printed color chart, and a change unit to revise the color conversion table using the scanned color chart.

31 Claims, 7 Drawing Sheets

FIG. 5

Modeling

- $P[x,y,z] = \alpha_1 x + \alpha_2 y + \alpha_3 z$
- $P[x,y,z] = \alpha_0 + \alpha_1 x + \alpha_2 y + \alpha_3 z$
- $P[x,y,z] = \alpha_1 x + \alpha_2 y + \alpha_3 z + \alpha_4 xy + \alpha_5 yz + \alpha_6 zx$
- $P[x,y,z] = \alpha_0 + \alpha_1 x + \alpha_2 y + \alpha_3 z + \alpha_4 xy + \alpha_5 yz + \alpha_6 zx + \alpha_{10} xyz$
- $P[x,y,z] = \alpha_1 x + \alpha_2 y + \alpha_3 z + \alpha_4 xy + \alpha_5 yz + \alpha_6 zx + \alpha_7 x^2 + \alpha_8 y^2 + \alpha_9 z^2$
- $P[x,y,z] = \alpha_0 + \alpha_1 x + \alpha_2 y + \alpha_3 z + \alpha_4 xy + \alpha_5 yz + \alpha_6 zx + \alpha_7 x^2 + \alpha_8 y^2 + \alpha_9 z^2 + \alpha_{10} xyz$
- $P[x,y,z] = \alpha_0 + \alpha_1 x + \alpha_2 y + \alpha_3 z + \alpha_4 xy + \alpha_5 yz + \alpha_6 zx + \alpha_7 x^2 + \alpha_8 y^2 + \alpha_9 z^2 + \alpha_{10} xyz + \alpha_{11} x^3 + \alpha_{12} y^3 + \alpha_{13} z^3$
- $P[x,y,z] = \alpha_0 + \alpha_1 x + \alpha_2 y + \alpha_3 z + \alpha_4 xy + \alpha_5 yz + \alpha_6 zx + \alpha_7 x + \alpha_8 y + \alpha_9 z + \alpha_{10} xyz + \alpha_{11} x^3 + \alpha_{12} y^3 + \alpha_{13} z^3 + \alpha_{14} xy^2 + \alpha_{15} x^2 y + \alpha_{16} yz^2 + \alpha_{17} y^2 z + \alpha_{18} zx^2 + \alpha_{19} z^2 x$

FIG. 6

$\alpha = (\widetilde{PQ})^{-1}(\widetilde{PR})$ $\widetilde{P} = \begin{bmatrix} x_1 & x_2 & x_3 & x_4 & x_5 & x_6 & x_7 & x_8 \\ y_1 & y_2 & y_3 & y_4 & y_5 & y_6 & y_7 & y_8 \\ z_1 & z_2 & z_3 & z_4 & z_5 & z_6 & z_7 & z_8 \end{bmatrix}$ $\widetilde{Q} = \begin{bmatrix} x_1 & y_1 & z_1 \\ x_2 & y_2 & z_2 \\ x_3 & y_3 & z_3 \\ x_4 & y_4 & z_4 \\ x_5 & y_5 & z_5 \\ x_6 & y_6 & z_6 \\ x_7 & y_7 & z_7 \\ x_8 & y_8 & z_8 \end{bmatrix} \quad \widetilde{R} = \begin{bmatrix} P_1 \\ P_2 \\ P_3 \\ P_4 \\ P_5 \\ P_6 \\ P_7 \\ P_8 \end{bmatrix}$

| Index | x | y | z | P |
|---|---|---|---|---|
| 1 | $x_1$ | $y_1$ | $z_1$ | $P_1$ |
| 2 | $x_2$ | $y_2$ | $z_2$ | $P_2$ |
| 3 | $x_3$ | $y_3$ | $z_3$ | $P_3$ |
| 4 | $x_4$ | $y_4$ | $z_4$ | $P_4$ |
| 5 | $x_5$ | $y_5$ | $z_5$ | $P_5$ |
| 6 | $x_6$ | $y_6$ | $z_6$ | $P_6$ |
| 7 | $x_7$ | $y_7$ | $z_7$ | $P_7$ |
| 8 | $x_8$ | $y_8$ | $z_8$ | $P_8$ |

$\begin{bmatrix} \alpha_1 \\ \alpha_2 \\ \alpha_3 \end{bmatrix} = \left[ \begin{bmatrix} x_1 & x_2 & x_3 & x_4 & x_5 & x_6 & x_7 & x_8 \\ y_1 & y_2 & y_3 & y_4 & y_5 & y_6 & y_7 & y_8 \\ z_1 & z_2 & z_3 & z_4 & z_5 & z_6 & z_7 & z_8 \end{bmatrix} \begin{bmatrix} x_1 & y_1 & z_1 \\ x_2 & y_2 & z_2 \\ x_3 & y_3 & z_3 \\ x_4 & y_4 & z_4 \\ x_5 & y_5 & z_5 \\ x_6 & y_6 & z_6 \\ x_7 & y_7 & z_7 \\ x_8 & y_8 & z_8 \end{bmatrix} \right]^{-1} \begin{bmatrix} x_1 & x_2 & x_3 & x_4 & x_5 & x_6 & x_7 & x_8 \\ y_1 & y_2 & y_3 & y_4 & y_5 & y_6 & y_7 & y_8 \\ z_1 & z_2 & z_3 & z_4 & z_5 & z_6 & z_7 & z_8 \end{bmatrix} \begin{bmatrix} P_1 \\ P_2 \\ P_3 \\ P_4 \\ P_5 \\ P_6 \\ P_7 \\ P_8 \end{bmatrix}$

IMAGE FORMING APPARATUS AND METHOD OF COLOR REVISING

CROSS-REFERENCE TO RELATED APPLICATIONS

This application claims the benefit under 35 U.S.C. §119(a) from Korean Patent Application Nos. 2011-0059772 filed on Jun. 20, 2011, and 2011-0100696 filed on Oct. 4, 2011 in the Korean Intellectual Property Office, the entire disclosure of which is incorporated herein by reference.

BACKGROUND OF THE INVENTION

1. Field of the Invention

The present general inventive concept relates to an image forming apparatus and a method of revising color. More particularly, the present general inventive concept relates to an image forming apparatus to revise color to achieve a user's intended output characteristics, and a method of revising the color.

2. Description of the Related Art

An image forming apparatus prints printing data generated by a printing control terminal device such as computer, onto a recording medium. Examples of the image forming apparatus include a copier, a printer, a fax machine, or a Multi Function Peripheral (MFP) combining functions of the copier, the printer, and the fax machine in a single device.

To maintain initial output characteristics, the related art retains the output characteristics of the image forming apparatus through gamma or halftone correction using a conventional C/M/Y/K gradation chart with only increasing saturation. That is, the related art adopts a one-dimensional revising method for C/M/Y/K output channels.

While the conventional method can revise the overall brightness or saturation characteristics of the image forming apparatus, there is a limit in maintaining gray balance or color balance.

In addition, since the conventional revising method can merely correct the brightness or the saturation, it is difficult to satisfy a user's desired color characteristics.

SUMMARY OF THE INVENTION

The present general inventive concept provides an image forming apparatus to revise color to achieve a user's desired output characteristics, and a method to revise the color.

Additional features and/or utilities of the present general inventive concept will be set forth in part in the description which follows and, in part, will be obvious from the description, or may be learned by practice of the general inventive concept.

The foregoing and/or other features and utilities of the present general inventive concept may be realized by an image forming apparatus which includes a storage unit to store a color conversion table, a user interface unit to receive a color revision initiation command, an image forming unit to print a color chart generated based on the color conversion table if the color revision initiation command is received, the color chart including a plurality of CMYK mixed colors having at least one of brightness and chroma changed, a scan unit to scan the printed color chart, and a change unit to revise the color conversion table using the scanned color chart.

The CMYK mixed color may correspond to a sampled RGB color value of RGB color values of a color conversion table pre-stored in the image forming apparatus.

The color chart may include a plurality of CMYK mixed colors arrayed in the form of matrix, and each group of a plurality of CMYK mixed colors may be classified according to their hue and aligned in a first direction, and a plurality of CMYK mixed colors aligned in a second direction which is perpendicular to the first direction according to their brightness, and each group of a plurality of CMYK mixed colors may have different chromas from each other.

The color chart may include a plurality of CMYK mixed colors arrayed in the form of matrix, and each group of a plurality of CMYK mixed colors may be classified according to their hue and aligned in a first direction, and a plurality of CMYK mixed colors aligned in a second direction which is perpendicular to the first direction according to their chroma, and each group of a plurality of CMYK mixed colors may have different brightnesses from each other.

The color chart may include a second area wherein a black and white gradation is displayed on both sides of the groups of a plurality of CMYK mixed colors.

The color chart may include a third area wherein a plurality of CMY colors is arranged on both sides of the groups of a plurality of CMYK mixed colors.

The color chart may include a fourth area wherein a plurality of black colors is displayed separately from each other in the four corners of the groups of a plurality of CMYK mixed colors.

The image forming apparatus may compare an RGB color value of the scanned color chart and an RGB color value of the color conversion table in an RGB color space, and include a comparison unit to redefine RGB color mapping characteristics of the image forming apparatus based on the comparison result so that the RGB color value of the scanned color chart corresponds to the RGB color value of the color conversion table. The change unit may change the color conversion table based on the redefined RGB color mapping characteristics.

The comparison unit may extract a color value of the scanned color chart, generate a three-dimensional RGB color matrix of the scanned color chart using the extracted color value, generate a three-dimensional RGB color matrix of the color conversion table using the color conversion table, and compare the generated three-dimensional RGB color matrix of the color chart and the generated three-dimensional RGB color matrix of the color conversion table.

The scan unit may convert at least one of a color space, a number of colors, and a color arrangement of the scanned color chart.

The color conversion table may be at least one of a three-dimensional RGB color table for scanning and a three-dimensional RGB color table for printing with the image forming apparatus.

Features and/or utilities of the present general inventive concept may also be realized by an image forming apparatus including a storage unit to store a color conversion table, a user interface unit to receive a color revision initiation command, a communication interface unit to send an image corresponding to a color chart generated based on the color conversion table to other image forming apparatus if the color revision initiation command is received, the color chart including a plurality of CMYK mixed colors having at least one of brightness and chroma changed, a scan unit to scan a color chart printed by the other image forming apparatus, and a change unit to revise the color conversion table using the scanned color chart.

The image forming apparatus may compare an RGB color value of the scanned color chart and an RGB color value of the color conversion table in an RGB color space, and include a comparison unit to redefine RGB color mapping characteristics of the image forming apparatus based on the comparison result so that the RGB color value of the scanned color chart corresponds to the RGB color value of the color conversion table. The change unit may change the color conversion table based on the redefined RGB color mapping characteristics.

Features and/or utilities of the present general inventive concept may also be realized by a method for revising a color in an image forming apparatus which includes receiving a color revision initiation command, printing a color chart if the color revision initiation command is received, the color chart including a plurality of CMYK mixed colors having at least one of brightness and chroma changed, scanning the printed color chart, and revising a color conversion table of the image forming apparatus using the scanned color chart.

The CMYK mixed color may correspond to a sampled RGB color value of RGB color values of a color conversion table pre-stored in the image forming apparatus.

The color chart may include a plurality of CMYK mixed colors arrayed in the form of matrix, and each group of a plurality of CMYK mixed colors may be classified according to their hue and aligned in a first direction, and a plurality of CMYK mixed colors aligned in a second direction which is perpendicular to the first direction according to their brightness, and each group of a plurality of CMYK mixed colors may have different chromas from each other.

The color chart may include a plurality of CMYK mixed colors arrayed in the form of matrix, and each group of a plurality of CMYK mixed colors may be classified according to their hue and aligned in a first direction, and comprise groups of a plurality of CMYK mixed colors aligned in a second direction which is perpendicular to the first direction according to their chroma, and each group of a plurality of CMYK mixed colors may have different brightnesses from each other.

The color chart may include a second area wherein a black and white gradation is displayed on both sides of the groups of a plurality of CMYK mixed colors.

The color chart may include a third area wherein a plurality of CMY colors is arranged on both sides of the groups of a plurality of CMYK mixed colors.

The color chart may include a fourth area wherein a plurality of black colors is displayed separately from each other in the four corners of the groups of a plurality of CMYK mixed colors.

The changing the color conversion table may include comparing an RGB color value of the scanned color chart and an RGB color value of the color conversion table pre-stored in the image forming apparatus in an RGB color space, redefining the RGB color mapping characteristics based on the comparison result so that the RGB color value of the scanned color chart is identical to the RGB color value of the color conversion table, and changing the color conversion table based on the redefined RGB color mapping characteristics.

The comparing may include extracting a color value of the scanned color chart, generating a three-dimensional RGB color matrix of the scanned color chart using the extracted color value, generating a three-dimensional RGB color matrix of the color conversion table using the color conversion table prestored in the image forming apparatus, and comparing the generated three-dimensional RGB color matrix of the color chart and the generated three-dimensional RGB color matrix of the color conversion table.

The method of revising a color may further include converting at least one of a color space, a number of colors, and a color arrangement of the scanned color chart.

The pre-stored color conversion table may be at least one of a three-dimensional RGB color table for scanning and a three-dimensional RGB color table for printing of the image forming apparatus.

Features and/or utilities of the present general inventive concept may also be realized by a method of revising a color in an image forming apparatus may comprise receiving a color revision initiation command, sending an image corresponding to a color chart to other image forming apparatus if the color revision initiation command is received, the color chart including a plurality of CMYK mixed colors having at least one of brightness and chroma changed, scanning a color chart printed by the other image forming apparatus, and changing a color conversion table of the image forming apparatus using the scanned color chart.

The changing the color conversion table may include comparing an RGB color value of the scanned color chart and an RGB color value of the color conversion table pre-stored in the image forming apparatus in an RGB color space, redefining the RGB color mapping characteristics based on the comparison result so that the RGB color value of the scanned color chart corresponds to the RGB color value of the color conversion table, and changing the color conversion table based on the redefined RGB color mapping characteristics.

Features and/or utilities of the present general inventive concept may also be realized by an image forming apparatus and/or a method of revising a color which corrects brightness, chroma, and hue so as to have output characteristics which a user wishes.

Features and/or utilities of the present general inventive concept may also be realized by an image forming apparatus including a storage unit to store a color conversion table, a scanning unit to scan a color chart, the color chart including a first area disposed in a central area of the color chart and having a plurality of CMYK mixed colors each having varying chromas and brightnesses, a second area disposed on left and right sides of the first area in the color chart, a control unit to determine left and right uniformity of the scanned color chart based on the second area, and a change unit to revise the color conversion table using the first area of the scanned color chart if the control unit determines that the scanned color chart has left and right uniformity.

The image forming apparatus may include an image forming unit to print the color chart.

The color chart may be printed by another image forming apparatus.

The second area may include columns on left and right sides of the first area including black and white gradations.

The second area may include columns on left and right sides of the first area including a plurality of CMYK mixed colors and CMY colors.

The second area may include black colors formed off of corners of the first area.

The control unit may determine upper and lower uniformity of the color chart based on the second area.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 5 and 6 are diagrams of mathematical modeling of regression according to an embodiment of the present general inventive concept.

DETAILED DESCRIPTION OF THE EMBODIMENTS

Figure 1:
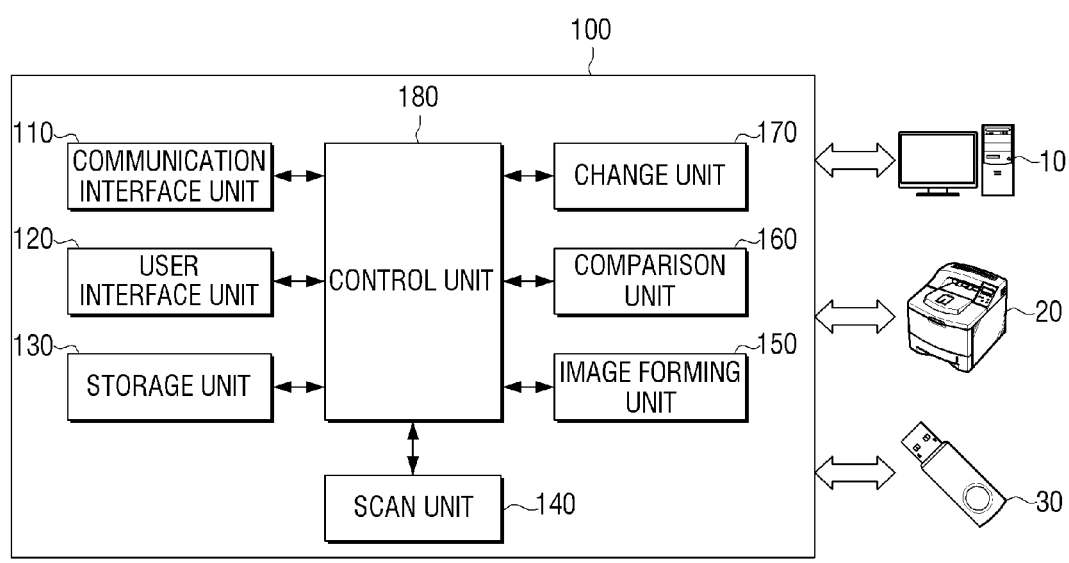
FIG. 1 is a block diagram of an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the drawings.

FIG. 1 is a block diagram of an image forming apparatus according to an embodiment of the present general inventive concept.

Referring to FIG. 1, the image forming apparatus 100 includes a communication interface unit 110, a user interface unit 120, a storage unit 130, a scan unit 140, an image forming unit 150, a comparison unit 160, a change unit 170, and a control unit 180.

The communication interface unit 110 is connected to a printing control terminal device 10, and receives printing data from the printing control terminal device 10. In detail, the communication interface unit 110 connects the image forming apparatus 100 and the printing control terminal device 10, and can include a parallel port, a Universal Serial Bus (USB) port, a wireless port, and the like. The printing control terminal device 10 may be, for example, a computer, a laptop, a tablet computer, or a mobile device, but is not limited thereto. The communication interface unit 110 may also connect the image forming apparatus 100 with another image forming apparatus 20 and/or an external storage device 30. The external storage device 30 may be, for example, a portable storage medium such as a USB device.

Figure 2:
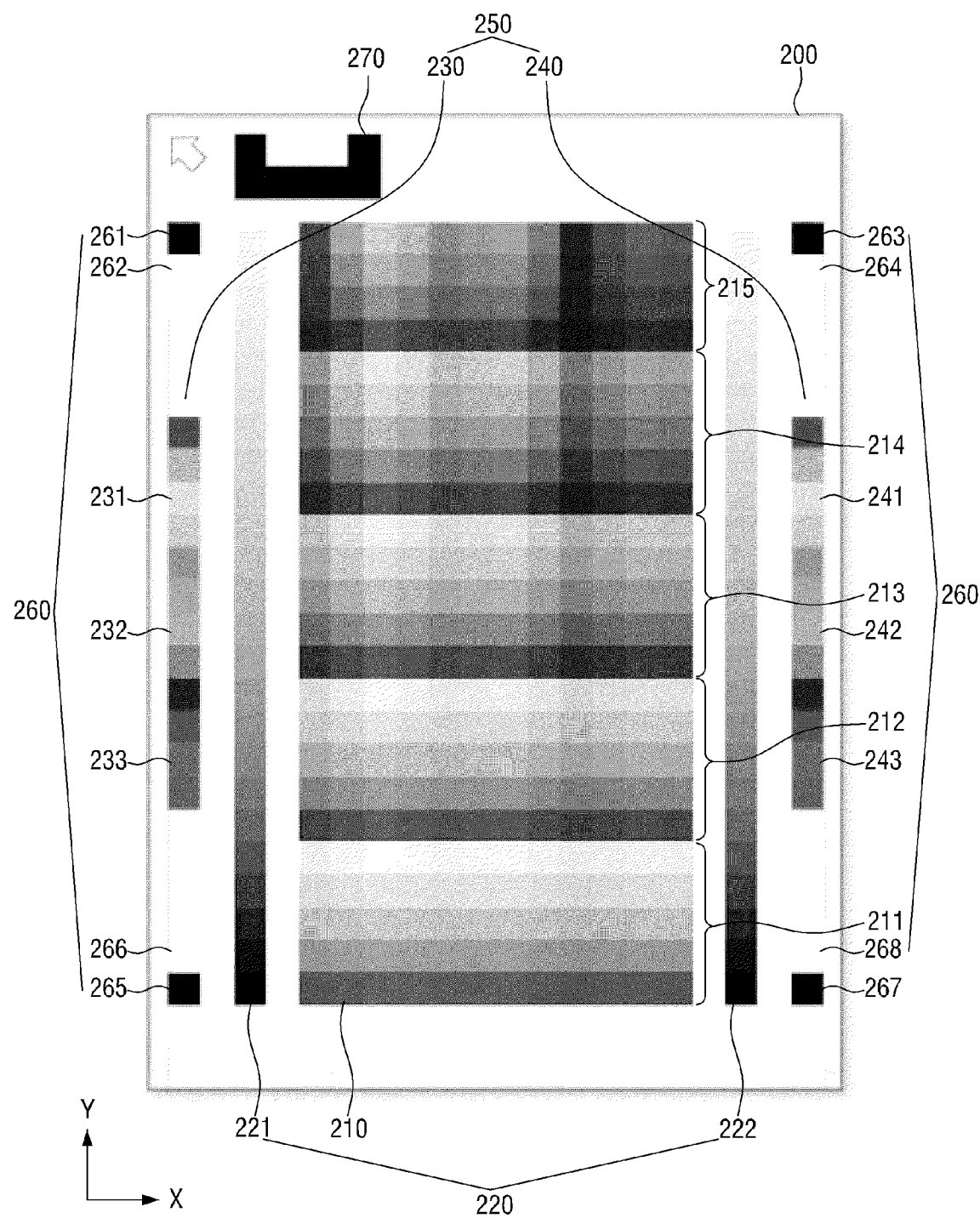
FIG. 2 is a diagram of a color chart according to a embodiment of the present general inventive concept.

The communication interface unit 110 can send an image corresponding to a color chart to the printing control terminal device 10, the other image forming apparatus 20, or the external storage device 30. Herein, the color chart is a chart including CMYK mixed colors including CMYK mixed colors corresponding to RBG colors, wherein at least one of brightness and chroma is changed in each of the plurality of CMYK mixed colors corresponding to RGB colors and each of the plurality of other CMYK mixed colors. In other words, the color chart has changes in chroma, brightness, and hue. Also, the CMYK mixed colors may correspond to RGB colors sampled from a color conversion chart of the image forming apparatus 100. Examples of the color chart are shown in FIG. 2.

While embodiments of the present general inventive concept provide examples only for sending to a printing control terminal device 10 or other image forming apparatus 20 via a communication interface unit 110, it may send an image corresponding to the color chart using a portable storage medium (e.g. USB storage medium) in the implementation.

The user interface unit 120 includes a plurality of function keys allowing a user to set or select various functions supported by the image forming apparatus 100, and displays diverse information provided from the image forming apparatus 100. The user interface unit 120 can be implemented using a device, such as touch pad, allowing the input and the output at the same time. The user interface unit 120 may also be implemented as an input device such as a mouse or keyboard along with a display device such as a monitor. In a user interface window provided from the user interface unit 120, the user can input a color revision initiation command for the color revision of the image forming apparatus 100, or a scan command for executing a color revising method. The color revision initiation command can include two commands. More particularly, the color initiation command can include an initial output characteristic maintain command for the image forming apparatus 100 to maintain initial output characteristics and a color characteristic change command for attaining output characteristics of another image forming apparatus.

The storage unit 130 stores the printing data. In more detail, the storage unit 130 can store the printing data received from the communication interface unit 110. The storage unit 130 can be implemented as a storage medium in the image forming apparatus 100. The storage unit 130 may also be implemented as the external storage device 30 such as a USB memory, or by a web server over a network.

The storage unit 130 also stores the color conversion table. The color conversion table is a look-up table including conversion values to transform the color of an RGB color space to the color of a CMYK color space. If printing data represents colors in the RGB printing space and the image forming apparatus 100 uses the CMYK color space to print the printing data, the color conversion table allows the transformation of the RGB color space to the CMYK color space in order to print the printing data. While only the color conversion table to transform the RGB color space to the CMYK color space is explained in this embodiment, a color conversion table can be used to transform color spaces other than the RGB color space to the CMYK color space or other color spaces.

The storage unit 130 can store a plurality of color conversion tables. In detail, the storage unit 130 can store a one-dimensional gamma table, a three-dimensional RGB color table corresponding to scanning, a three-dimensional RGB color table corresponding to printing, a panel table, and a screen table. Herein, the three-dimensional RGB color table corresponding to printing corresponds to the aforementioned color conversion table. While only the color revision for the three-dimensional RGB color table corresponding to printing is explained in this embodiment, the color revising method, to be explained, may also be applied to the three-dimensional RGB color table corresponding to scanning. Also, the color revising method can be applied to the gamma table.

The storage unit 130 can store an image corresponding to the color chart. In detail, the storage unit 130 can store an image corresponding to the color chart including the plurality of the CMYK mixed colors corresponding to RGB colors. The color conversion table can be changed by the change unit 170, which is discussed in more detail later. When the color conversion table is converted, the image corresponding to the color chart can be changed accordingly.

The scan unit 140 includes a lens to focus the light reflected from a script on an internal image sensor and to read image information of the script from the light focused on the image sensor. The scan unit 140 scans the color chart and provides the scanned color chart to the comparison unit 160. In so doing, the scan unit 140 can provide the image corresponding to the scanned color chart to the comparison unit 160, or extract and provide the color value of the scanned color chart to the comparison unit 160. The scan unit 140 can be disposed in a flatbed or in a Duplexing Automatic Document Feeder (DADF) type scanning device.

The scan unit 140 can convert at least one of the color space, the number, and the color arrangement of the scanned color chart. For example, when the color chart scanned by the scan unit 140 is not the chart of FIG. 2, the scan unit 140 can transform the scanned color chart in accordance with the color space, the number, and/or the color arrangement of the chart as shown in FIG. 2 while maintaining the color values of the scanned color chart. In so doing, the scan unit 140 can provide the converted color chart to the comparison unit 160.

While the scan unit 140 in the image forming apparatus 100 directly scans and utilizes the color chart in this embodiment, the color chart may be scanned by an external scanner and the scanned color chart may be received from the external scanner using the communication interface unit 110.

The image forming unit 150 prints the printing data. The image forming unit 150 also prints printing data received via the communication interface unit 110.

The image forming unit 150 also prints the color chart. In detail, the image forming unit 150 can print the color chart including the plurality of the CMYK mixed colors corresponding to RGB colors.

Meanwhile, when the color conversion initiation command of the user is a color characteristic change command to obtain the output characteristics of the other image forming apparatus 20, the color chart can be printed by the other image forming apparatus 20. In this case, the communication interface unit 110 can send the image corresponding to the color chart to the other image forming apparatus 20 or the printing control terminal device 10 connected to the other image forming apparatus 20 so as to print the color chart with the other image forming apparatus 20.

While the image forming apparatus 100 or the other image forming apparatus 20 prints the color chart to be used in this embodiment, the color chart to be used may also be provided by a manufacturer or other supplier.

The comparison unit 160 compares the color values of the scanned color chart and the color values of the color conversion table in the RGB color space. More specifically, the comparison unit 160 can extract the color value of the color chart from the color chart scanned by the scan unit 140, and generates a three-dimensional RGB color matrix of the scanned color chart using the extracted color value. In so doing, the comparison unit 160 can generate the three-dimensional RGB color matrix from the scanned color values using a regression technique as shown in FIG. 5 and FIG. 6. Herein, the regression technique derives the undefined RGB color space using the plurality of the color values, which is well known and thus shall be omitted. The color chart according to the embodiment has a plurality of hues (i.e. CMYK mixed colors corresponding to RGB colors) and CMYK mixed colors wherein brightness and chroma have been changed as to each hue, and thus may generate the precise three-dimensional RGB color matrix.

The comparison unit 160 can generate the three-dimensional RGB color matrix of the color conversion table using color values of the color conversion table. The three-dimensional RGB color matrix of the color conversion table can be generated using the regression technique as shown in FIG. 5 and FIG. 6.

The comparison unit 160 can compare mutually the generated three-dimensional RGB color matrix of the color chart and the generated three-dimensional RGB color matrix of the color conversion table. In so doing, the comparison unit 160 can compare the three-dimensional RGB color matrix of the color chart and the three-dimensional RGB color matrix of the color conversion table using 3D interpolation.

Based on the result of the comparison, the comparison unit 160 redefines RGB color mapping characteristics of the image forming apparatus 100. In detail, when the color revision initiation command of the user is the initial output characteristic maintain command, the comparison unit 160 can redefine the RGB color mapping characteristics so that an RGB color value of a scanned color chart that was printed by the image forming apparatus 100 corresponds to an RGB color value of the color conversion table.

When the color revision initiation command of the user is the color characteristic change command to take the output characteristics of the other image forming apparatus 20, the comparison unit 160 can redefine the RGB color mapping characteristics so that an RGB color value of the color conversion table corresponds to an RGB color value of the scanned color chart that was printed by the other image forming apparatus 20.

The change unit 170 revises the color corresponding to the input command using the scanned chart. In detail, when the command input via the user interface unit 120 is the initial output characteristic maintain command, the change unit 170 can update the color conversion table stored to the storage unit 130 such that the image forming unit 150 has the initial output characteristics. In other words, the change unit 170 can update the color conversion table using the RGB color mapping characteristics using a scanned color chart that was printed by the image forming apparatus 100.

Conversely, when the command input via the user interface unit 120 is the color characteristic change command, the change unit 170 can update the color conversion table stored to the storage unit 130 such that the image forming unit 150 takes on the color characteristics of the other image forming apparatus 20. In detail, the change unit 170 can update the color conversion table using the RGB color mapping characteristics using a scanned color chart that was printed by the other image forming apparatus 20.

While the comparison unit 160 and the change unit 170 are separated in this embodiment, the comparison unit 160 and the change unit 170 may also be implemented as a single unit.

The control unit 180 controls the components of the image forming apparatus 100. When the initial output characteristic maintain command is input from the user via the user interface unit 120, the control unit 180 can control the image forming unit 150 to print the color chart and control the scan unit 140 to scan the printed color chart. The control unit 180 can control the comparison unit 160 to compare the color value of the scanned color chart and the color value of the color conversion table in the RGB color space, redefine the RGB color mapping characteristics such that the RGB color value of the scanned color chart corresponds to the RGB color value of the color conversion table, and control the change unit 170 to modify the color conversion table based on the redefined RGB color mapping characteristics.

When receiving the color characteristic change command from the user via the user interface unit 120, the control unit 180 can control the scan unit 140 to scan the color chart printed by the other image forming apparatus 20. Next, the control unit 180 can control the comparison unit 160 to compare the color value of the scanned color chart and the color value of the color conversion table in the RGB color space, redefine the RGB color mapping characteristics such that the RGB color value of the color conversion table corresponds to the RGB color value of the scanned color chart, and control the change unit 170 to modify the color conversion table based on the redefined RGB color mapping characteristics.

The control unit 180 can also determine whether the color chart has a left and right or an upper and lower uniformity. More specifically, any of the second through fourth areas 220, 250, and 260 of the color chart 200 illustrated in FIG. 2 may be used to determine a left and right uniformity. The fourth area 260 may be used to determine an upper or lower uniformity. If the control unit 180 determines that the color chart does not have a left and right or an upper and lower uniformity, the control unit 180 may stop the image forming apparatus 100 from revising the color conversion table. For example, the color chart may be determined to have left and right uniformity when the concentration deviation between left and right sides of the color chart is below a predetermined value.

As described above, the image forming apparatus 100 can retain the initial brightness, chroma, and color characteristics of a manufacturer through the color revision. Also, the image forming apparatus 100 can reproduce the color characteristics of the other image forming apparatus 20.

200 FIG. 2 is a diagram of a color chart 200 according to an embodiment of the present general inventive concept.

Referring to FIG. 2, the color chart 200 according to this embodiment comprises a first area 210, a second area 220, a third area 250, a fourth area 260, and a fifth area 270.

The first area 210 is an area to display a plurality of CMYK mixed colors for a revision of brightness, chroma, and hue of the image forming apparatus 100, namely a color revision. Specifically, the first area 210 includes groups (211, 212, 213, 214, and 215) of a plurality of CMYK mixed colors in the form of matrix. Herein, the brightness of the plurality of CMYK mixed colors is varied between each group. That is, each of the CMYK colors in a first group 211 may have the same brightness and each of the CMYK mixed colors in a second group 212 may have a different brightness. Within each group, the hue of the plurality of CMYK mixed colors is varied in a first direction (X-axis direction). Also, within each group, the chroma of the plurality of CMYK mixed colors is varied in a second direction (Y-axis direction or printing (or scanning) direction) which is perpendicular to the first direction.

In detail, the first area 210 of the color chart includes columns of CMYK mixed colors each corresponding to a respective RGB color value sampled from among RGB color values included in the color conversion table. That is, the first column of the first area 210 has a first CMYK mixed color, the second column of the first area 210 has a second CMYK mixed color, and so on. The brightness of the CMYK mixed colors is varied between the rows of each of the groups (211, 212, 22213, 214 and 215). That is, the first row of a group has a first brightness, the second row of a group has a second brightness, and so on. The chroma of the CMYK mixed colors is varied between each of the groups (211, 212, 22213, 214 and 215). That is, the first group 211 has a first chroma, the second group 212 has a second chroma, and so on.

While only examples of a color chart wherein brightness is varied within a group and chroma is changed between groups is illustrated and explained in this embodiment of the present general inventive concept, the present general inventive concept is not limited thereto. According to the present general inventive concept, chroma may be varied within a group and brightness may be varied between groups.

The second area 220 is an area to display a black and white gradation. Specifically, the second area 220 includes two columns 221 and 222 which each include black and white gradations in the printing (or scanning) direction. The two columns 221 and 222 may be arranged on the left side and right side of the first area 210. The second area 220 is an area for understanding whether a concentration deviation between left and right sides of a printed color chart or the scan unit 140 exists. Further, it is possible to correct brightness of the K channel using the second area 220.

The third area 250 is an area to display CMY colors (231, 232, 233, 241, 242, and 243) and a plurality of CMYK mixed colors. In detail, the third area 250 includes two columns 230 and 240 including the CMY colors (231, 232, 233, 241, 242, and 243) and the CMYK mixed colors arranged in the printing (or scanning) direction on the left side 230 and right side 240 of the first area 210. The third area 250 is an area for understanding whether a concentration deviation between left and right sides of a printed color chart or the scan unit 140 exists. The area corresponding to the CMY color yellow (231, 241) is an area to ascertain left and right uniformity and a standard value as to the Y channel, and a deviation of current scanning values (concentration). The area corresponding to the CMY color cyan (232, 242) is an area for ascertaining left and right uniformity and standard value as to the C channel, and a deviation of current scanning values (concentration). The area corresponding to the CMY color magenta (233, 243) is an area for ascertaining left and right uniformity and standard value as to the M channel, and a deviation of current scanning values (concentration).

Accordingly, the image forming apparatus 100 can ascertain left and right uniformity using the third area 250, and if there is left and right uniformity, the color revision as mentioned above can be made. If it is determined from the color chart 200 that there is no left and right uniformity, it can indicate that an accurate color revision cannot be made based on the color chart. Also, if it is determined that there is no left and right uniformity, it can indicate that problems exist in the image forming apparatus 100. Thus, if there is no left and right uniformity in the color chart, the image forming apparatus 100 may not perform the color revision and may also indicate to a user that an error has occurred.

The fourth area 260 is an area wherein a plurality of black colors is displayed separately from each other off of the four corners of the first area 210. In detail, the fourth areas 260 includes four areas (261, 263, 265, and 267) arranged respectively off of the left upper side, the left lower side, the right upper side, and the right lower side of the first area 210. The fourth area 260 is an area for ascertaining upper/lower and left/right uniformity and a standard value as to the K channel, and a deviation of current scanning values. The image forming apparatus 100 can also ascertain uniformity in paper colors using white areas (262, 264, 266, and 268) located on the upper side or the lower side of the fourth area 260.

The fifth area 270 is an area for printing a preset shape. The fifth area 270 is an area for ascertaining distortion of a color chart and the degree of inclination of X-axis and Y-axis.

Likewise, the color chart according to the embodiment comprises a plurality of CMYK mixed colors wherein brightness and chroma are changed, and the image forming apparatus 100 using the above makes it possible to carry out a three-dimensional revision (brightness, chroma, and hue) in an RGB color space. Further, the color chart according to the embodiment comprises areas for ascertaining left and right uniformity.

Figure 3:
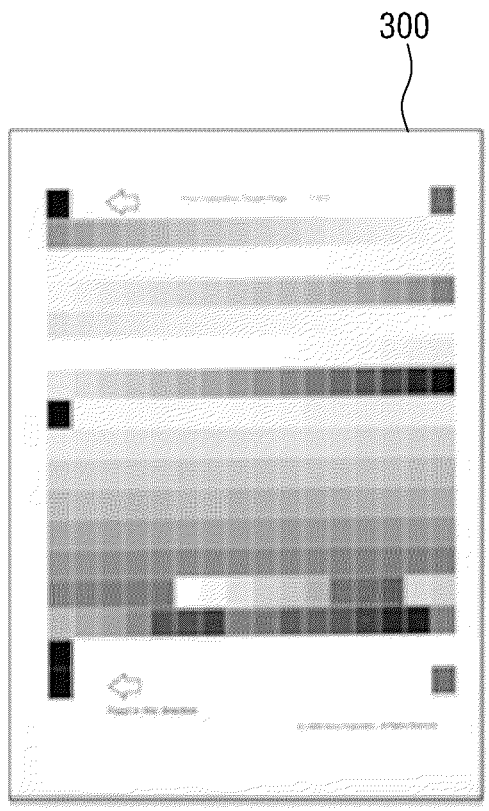
FIG. 3 is a diagram of a conventional color chart.

The color chart according to the embodiment includes a second area to a fifth area, and thus a color revision is possible by ascertaining uniformity in the scanning unit 140 and the image forming unit 150. FIG. 3 is a diagram of a conventional color chart.

Referring to FIG. 3, the conventional color chart prints gradation charts of different saturations for C channel, M channel, Y channel, and K channel, respectively. When the gradation chart is used for the CMYK channels, only the one-dimensional revision is possible.

Figure 4:
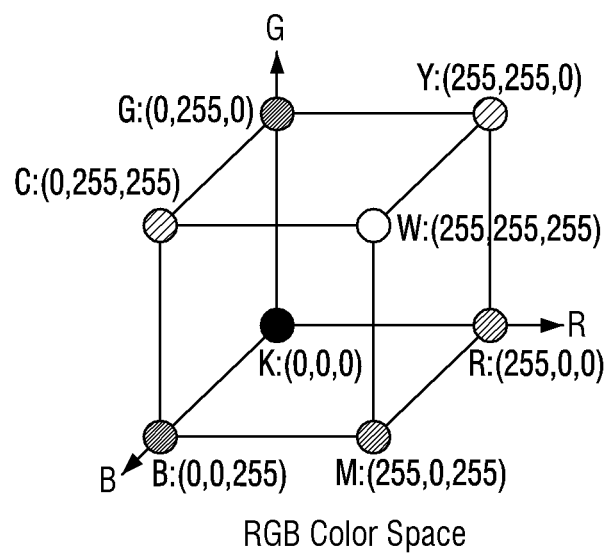
FIG. 4 is a diagram of an RGB color space.

FIG. 4 is a diagram of an RGB color space. Referring to FIG. 4, the axes of the RGB color space correspond to the colors red, green, and blue.

Figure 7:
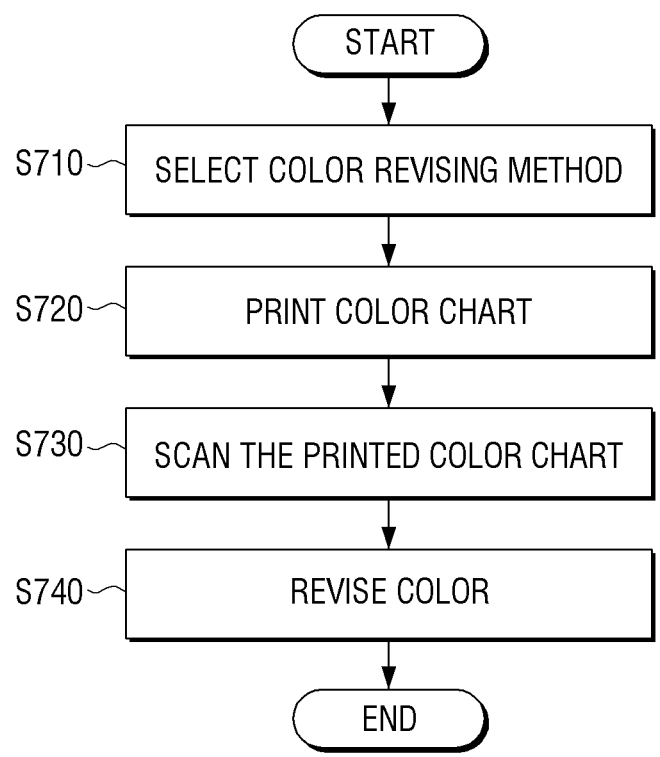
FIG. 7 is a flowchart of a method for revising color according to an embodiment of the present general inventive concept.

FIG. 7 is a flowchart of a method of revising a color according to an embodiment of the present general inventive concept.

Referring to FIG. 7, the color revising method is selected (S710). In detail, either the initial output characteristics maintain command or the color characteristics change command can be input from the user. Herein, the initial output characteristic maintain command is the color revision command to retain the initial output characteristics in the image forming apparatus 100, and the color characteristic change command is the color revision command to obtain the output characteristics of the other image forming apparatus 20 in the image forming apparatus 100.

Next, the color chart having CMYK mixed colors is printed (S720). When the user's color revision initiation command is the color characteristic change command, the other image forming apparatus 20 can print the color chart. Meanwhile, when the color chart is printed in advance (for example, when the manufacturer provides the color chart at the product release), the printing of the color chart can be omitted.

The printed color chart is scanned (S730). When the scanned color chart is not the color chart of FIG. 2, at least one of the color space, the number, and the color arrangement of the scanned color chart can be changed. Using the scanned color chart, the color is revised according to the input command (S740). In detail, the three-dimensional color revision (brightness, chroma, and hue) can be carried out by comparing the color value of the scanned color chart and the color value of the color conversion table pre-stored in the image forming apparatus in the RGB color space, redefining the RGB color mapping characteristics of the image forming apparatus based on the comparison result, and changing the color conversion table based on the redefined RGB color mapping characteristics. The color revision has been explained in detail by referring to FIG. 1 and thus shall not be further described.

Therefore, the color revising method according to an embodiment of the present general inventive concept can retain the initial brightness, chroma, and hue characteristics of the manufacturer through the color revision. The present color revising method can reproduce the color characteristics of the other image forming apparatus. The color revising method of FIG. 7 can be realized in the image forming apparatus of FIG. 1, and also in other image forming apparatuses.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising:
   a storage unit to store a color conversion table including conversion values to transform colors of an RGB color space to colors of a CMYK color space;
   a user interface unit to receive a color revision initiation command;
   an image forming unit to print a color chart generated based on the color conversion table if the color revision initiation command is received, the color chart including a plurality of CMYK mixed colors having at least one of brightness and chroma changed;
   a scan unit to scan the printed color chart; and
   a change unit to revise the color conversion table using the scanned color chart,
   wherein the color chart includes:
   a first area disposed in a central area of the color chart and having a plurality of CMYK mixed colors each having varying chromas and brightnesses;
   a second area disposed on left and right sides of the first area in the color chart,
   wherein the change unit determines left and right uniformity of the scanned color chart based on the second area and revises the color conversion table using the first area of the scanned color chart if the scanned color chart has left and right uniformity.

2. The image forming apparatus of claim 1, wherein the CMYK mixed color corresponds to a sampled RGB color value of RGB color values of a color conversion table pre-stored in the image forming apparatus.

3. The image forming apparatus of claim 1, wherein the color chart comprises:
   a plurality of CMYK mixed colors arrayed in the form of a matrix, each group of the plurality of CMYK mixed colors being classified according to their hue and aligned in a first direction; and
   a plurality of CMYK mixed colors aligned in a second direction perpendicular to the first direction according to their brightness, and each group of the plurality of CMYK mixed colors having different chromas from each other.

4. The image forming apparatus of claim 1, wherein the color chart comprises:
   a plurality of CMYK mixed colors arrayed in the form of a matrix, each group of the plurality of CMYK mixed colors is classified according to their hue and is aligned in a first direction; and
   a plurality of CMYK mixed colors aligned in a second direction which is perpendicular to the first direction according to their chroma, and each group of the plurality of CMYK mixed colors having different brightnesses from each other.

5. The image forming apparatus of claim 3, wherein the color chart further comprises:
   a third area in which a black and white gradation is displayed on both sides of the groups of a plurality of CMYK mixed colors.

6. The image forming apparatus of claim 3, wherein the color chart further comprises:
   a fourth area in which a plurality of black colors is displayed separately from each other in the four corners of the groups of a plurality of CMYK mixed colors.

7. The image forming apparatus of claim 1, further comprising:
   a comparison unit to compare an RGB color value of the scanned color chart and an RGB color value of the color conversion table in an RGB color space, and to redefine RGB color mapping characteristics of the image forming apparatus based on the comparison result so that the RGB color value of the scanned color chart corresponds to the RGB color value of the color conversion table,
   wherein the change unit changes the color conversion table based on the redefined RGB color mapping characteristics.

8. The image forming apparatus of claim 7, wherein the comparison unit extracts a color value of the scanned color chart, generates a three-dimensional RGB color matrix of the scanned color chart using the extracted color value, generates a three-dimensional RGB color matrix of the color conversion table using the color conversion table, and compares the generated three-dimensional RGB color matrix of the color chart and the generated three-dimensional RGB color matrix of the color conversion table.

9. The image forming apparatus of claim 1, wherein the scan unit converts at least one of a color space, a number of colors, and a color arrangement of the scanned color chart.

10. The image forming apparatus of claim 1, wherein the color conversion table is at least one of a three-dimensional RGB color table for scanning and a three-dimensional RGB color table for printing with the image forming apparatus.

11. An image forming apparatus comprising:
a storage unit to store a color conversion table including conversion values to transform colors of an RGB space to colors of a CMYK color space;
a user interface unit to receive a color revision initiation command;
a communication interface unit to send an image corresponding to a color chart generated based on the color conversion table if the color revision initiation command is received, the color chart including a plurality of CMYK mixed colors having at least one of brightness and chroma changed;
a scan unit to scan a color chart printed by another image forming apparatus; and
a change unit to revise the color conversion table using the scanned color chart,
wherein the color chart includes:
a first area disposed in a central area of the color chart and having a plurality of CMYK mixed colors each having varying chromas and brightnesses;
a second area disposed on left and right sides of the first area in the color chart,
wherein the change unit determines left and right uniformity of the scanned color chart based on the second area and revises the color conversion table using the first area of the scanned color chart if the scanned color chart has left and right uniformity.

12. The image forming apparatus of claim 11, further comprising:
a comparison unit to compare an RGB color value of the scanned color chart and an RGB color value of the color conversion table in an RGB color space, and to redefine RGB color mapping characteristics of the image forming apparatus based on the comparison result so that the RGB color value of the scanned color chart corresponds to the RGB color value of the color conversion table,
wherein the change unit changes the color conversion table based on the redefined RGB color mapping characteristics.

13. A method of revising a color in an image forming apparatus, comprising:
receiving a color revision initiation command;
printing a color chart if the color revision initiation command is received, the color chart including a plurality of CMYK mixed colors having at least one of brightness and chroma changed;
scanning the printed color chart; and
revising a color conversion table of the image forming apparatus using the scanned color chart, the color conversion table including conversion values to transform colors of an RGB space to the colors of a CMYK color space,
wherein the color chart includes:
a first area disposed in a central area of the color chart and having a plurality of CMYK mixed colors each having varying chromas and brightnesses;
a second area disposed on left and right sides of the first area in the color chart,
wherein the revising the color conversion table comprises:
determining left and right uniformity of the scanned color chart based on the second area, and
revising the color conversion table using the first area of the scanned color chart if the scanned color chart has left and right uniformity.

14. The method of claim 13, wherein the CMYK mixed color corresponds to a sampled RGB color value of RGB color values of a color conversion table prestored in the image forming apparatus.

15. The method of claim 13, wherein the color chart comprises:
a plurality of CMYK mixed colors arrayed in the form of a matrix, each group of the plurality of CMYK mixed colors being classified according to their hue and aligned in a first direction; and
a plurality of CMYK mixed colors aligned in a second direction perpendicular to the first direction according to their brightness, and each group of the plurality of CMYK mixed colors having different chromas from each other.

16. The method of claim 13, wherein the color chart comprises:
a plurality of CMYK mixed colors arrayed in the form of a matrix, each group of the plurality of CMYK mixed colors being classified according to their hue and aligned in a first direction; and
a plurality of CMYK mixed colors aligned in a second direction which is perpendicular to the first direction according to their chroma, and each group of the plurality of CMYK mixed colors having different brightnesses from each other.

17. The method of claim 15, wherein the color chart further comprises:
a third area in which a black and white gradation is displayed on both sides of the groups of a plurality of CMYK mixed colors.

18. The method of claim 16, wherein the color chart further comprises:
a fourth area in which a plurality of black colors is displayed separately from each other in the four corners of the groups of a plurality of CMYK mixed colors.

19. The method of claim 13, wherein the changing the color conversion table comprises:
comparing an RGB color value of the scanned color chart and an RGB color value of a color conversion table pre-stored in the image forming apparatus in an RGB color space;
redefining the RGB color mapping characteristics of the image forming apparatus based on the comparison result so that the RGB color value of the scanned color chart is identical to the RGB color value of the color conversion table; and
changing the color conversion table based on the redefined RGB color mapping characteristics.

20. The method of claim 15, wherein the comparing comprises:
extracting a color value of the scanned color chart;
generating a three-dimensional RGB color matrix of the scanned color chart using the extracted color value;
generating a three-dimensional RGB color matrix of the color conversion table using the color conversion table prestored in the image forming apparatus; and comparing the generated three-dimensional RGB color matrix of the color chart and the generated three-dimensional RGB color matrix of the color conversion table.

21. The method of claim 13, further comprising:
converting at least one of a color space, a number of colors, and a color arrangement of the scanned color chart.

22. The method of claim 13, wherein the pre-stored color conversion table is at least one of a three-dimensional RGB color table for scanning and a three-dimensional RGB color table for printing with the image forming apparatus.

23. A method of revising a color in an image forming apparatus, the method comprising:
receiving a color revision initiation command;
sending an image corresponding to a color chart to other image forming apparatus if the color revision initiation command is received, the color chart including a plurality of CMYK mixed colors having at least one of brightness and chroma changed;
scanning a color chart printed by the other image forming apparatus; and
revising a color conversion table of the image forming apparatus using the scanned color chart, the color conversion table including conversion values to transform colors of an RGB space to the colors of a CMYK color space,
wherein the color chart includes:
a first area disposed in a central area of the color chart and having a plurality of CMYK mixed colors each having varying chromas and brightnesses;
a second area disposed on left and right sides of the first area in the color chart,
wherein the revising the color conversion table comprises:
determining left and right uniformity of the scanned color chart based on the second area, and
revising the color conversion table using the first area of the scanned color chart if the scanned color chart has left and right uniformity.

24. The method of claim 23, wherein the changing the color conversion table comprises:
comparing an RGB color value of the scanned color chart and an RGB color value of a color conversion table pre-stored in the image forming apparatus in an RGB color space;
redefining the RGB color mapping characteristics of the image forming apparatus based on the comparison result so that the RGB color value of the scanned color chart corresponds to the RGB color value of the color conversion table; and
changing the color conversion table based on the redefined RGB color mapping characteristics.

25. An image forming apparatus, comprising:
a storage unit to store a color conversion table including conversion values to transform colors of an RGB space to the colors of a CMYK color space;
a scanning unit to scan a color chart, the color chart including:
a first area disposed in a central area of the color chart and having a plurality of CMYK mixed colors each having varying chromas and brightnesses;
a second area disposed on left and right sides of the first area in the color chart;
a control unit to determine left and right uniformity of the scanned color chart based on the second area; and
a change unit to revise the color conversion table using the first area of the scanned color chart if the control unit determines that the scanned color chart has left and right uniformity.

26. The image forming apparatus of claim 25, further comprising:
an image forming unit to print the color chart.

27. The image forming apparatus of claim 25, wherein the color chart is printed by another image forming apparatus.

28. The image forming apparatus of claim 25, wherein the second area includes columns on left and right sides of the first area including black and white gradations.

29. The image forming apparatus of claim 25, wherein the second area includes columns on left and right sides of the first area including a plurality of CMYK mixed colors and CMY colors.

30. The image forming apparatus of claim 25, wherein the second area includes black colors formed off of corners of the first area.

31. The image forming apparatus of claim 30, wherein the control unit determines upper and lower uniformity of the color chart based on the second area.

* * * * *

UNITED STATES PATENT AND TRADEMARK OFFICE
CERTIFICATE OF CORRECTION

PATENT NO. : 8,995,034 B2
APPLICATION NO. : 13/524233
DATED : March 31, 2015
INVENTOR(S) : In-ho Park et al.

Page 1 of 1

It is certified that error appears in the above-identified patent and that said Letters Patent is hereby corrected as shown below:

In the Claims

Claim 18, column 14, line 42, delete "claim 16," and insert --claim 15,--, therefor.

Signed and Sealed this
Twenty-third Day of June, 2015

Michelle K. Lee
*Director of the United States Patent and Trademark Office*